March 16, 1937.     V. R. RABY     2,073,998
CAMERA CARRIAGE
Filed April 6, 1936     3 Sheets-Sheet 2

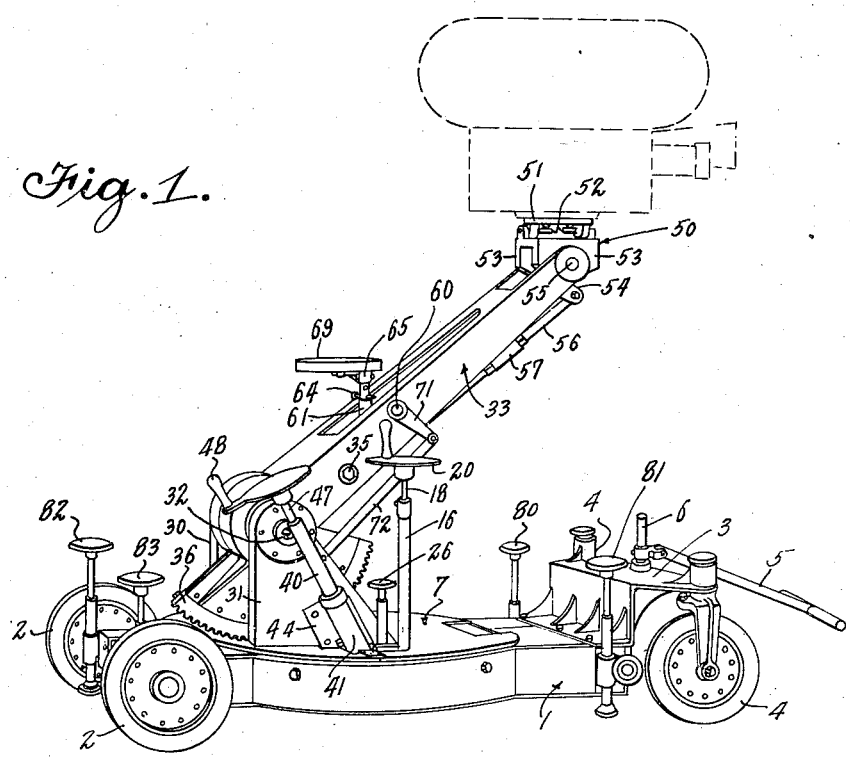
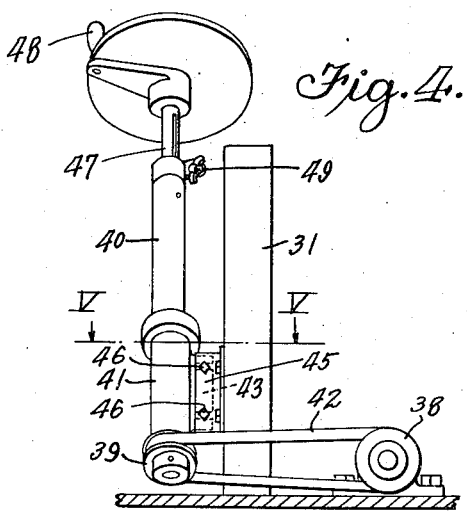
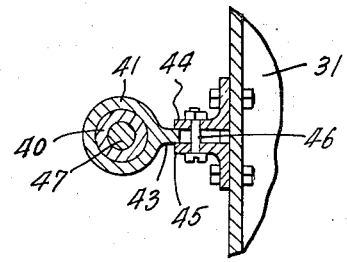

INVENTOR.
Victor R. Raby
BY Lyon & Lyon
ATTORNEYS

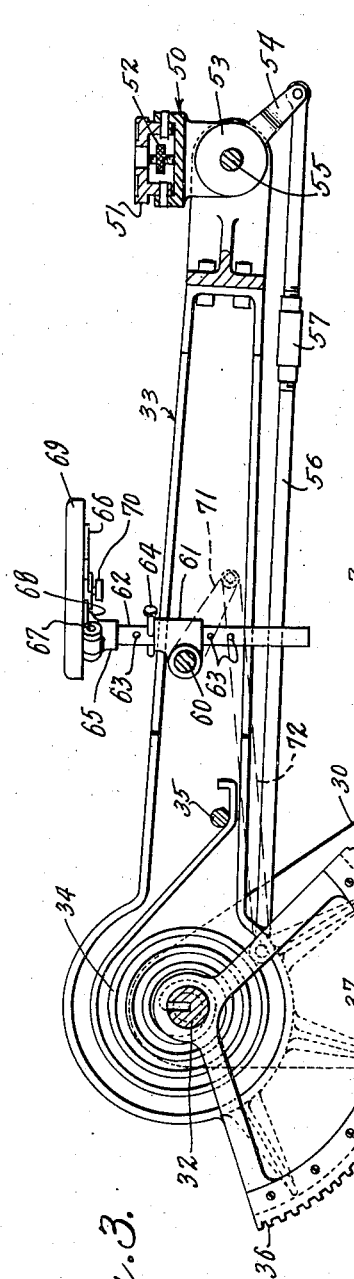

Patented Mar. 16, 1937

2,073,998

UNITED STATES PATENT OFFICE 2,073,998

CAMERA CARRIAGE

Victor R. Raby, Los Angeles, Calif., assignor to Studio Equipment Co., a partnership composed of Victor R. Raby and William J. Mulligan, Los Angeles, Calif.

Application April 6, 1936, Serial No. 73,048

4 Claims. (Cl. 248—124)

This invention relates to a camera carriage which is particularly adapted for use in supporting, guiding and positioning motion picture cameras during photography. In motion picture photography it is highly desirable that the camera readily assume various positions with respect to the subject being photographed. In order to produce the required pictorial or dramatic effect, it is often necessary that the camera be positioned either at some point close to the ground or can photograph the scene or subject from a considerable elevation. At other times it is desirable that the entire camera pivot or move so as to follow the subject.

The present invention is directed toward a portable camera carriage which is extremely compact and very flexible in operation, permitting photography to be carried out in a ready and facile manner without limiting the director or photographer.

Generally stated, the invention relates to a camera carriage which is movable in its entirety, such carriage being provided with a turntable on which a boom is mounted. Compensating spring means are carried by the boom, tending to raise the outer end thereof, thereby permitting manual adjustment of the boom with but little effort. The boom is also provided with a pivoted head which constitutes a camera support and an operator's or cameraman's seat. Both the camera support and the seat are automatically adjustable so that they maintain a substantially horizontal position irrespective of boom position.

An object of the invention, therefore, is to disclose and provide an improved camera carriage.

Another object is to disclose and provide a movable camera carriage provided with means whereby the camera may be raised or lowered and swung about in various directions.

A further object is to disclose and provide a camera carriage provided with spring compensating means whereby the major portion of the weight carried by the boom is automatically overcome.

A still further object of the invention is to disclose and provide a camera carriage which may be readily moved and adjusted with the expenditure of but little effort.

These and other objects, uses, advantages and adaptations of the invention will become apparent to those skilled in the art from the following detailed description of one illustrative embodiment of the invention.

In the subsequent description, reference will be had to the appended drawings, in which:

Fig. 1 is a perspective view of the entire carriage.

Fig. 3 is a vertical section through a portion of the turntable and boom of the carriage.

Fig. 4 is an enlarged vertical section taken along the plane IV—IV of Fig. 2.

Fig. 5 is a section taken along the plane V—V of Fig. 4.

Fig. 6 is a plan view of the braking means provided on the turntable.

Fig. 7 is an enlarged vertical section along the plane VII—VII of Fig. 6.

Fig. 8 is an enlarged vertical section taken along the plane VIII—VIII of Fig. 2.

Figure 2:
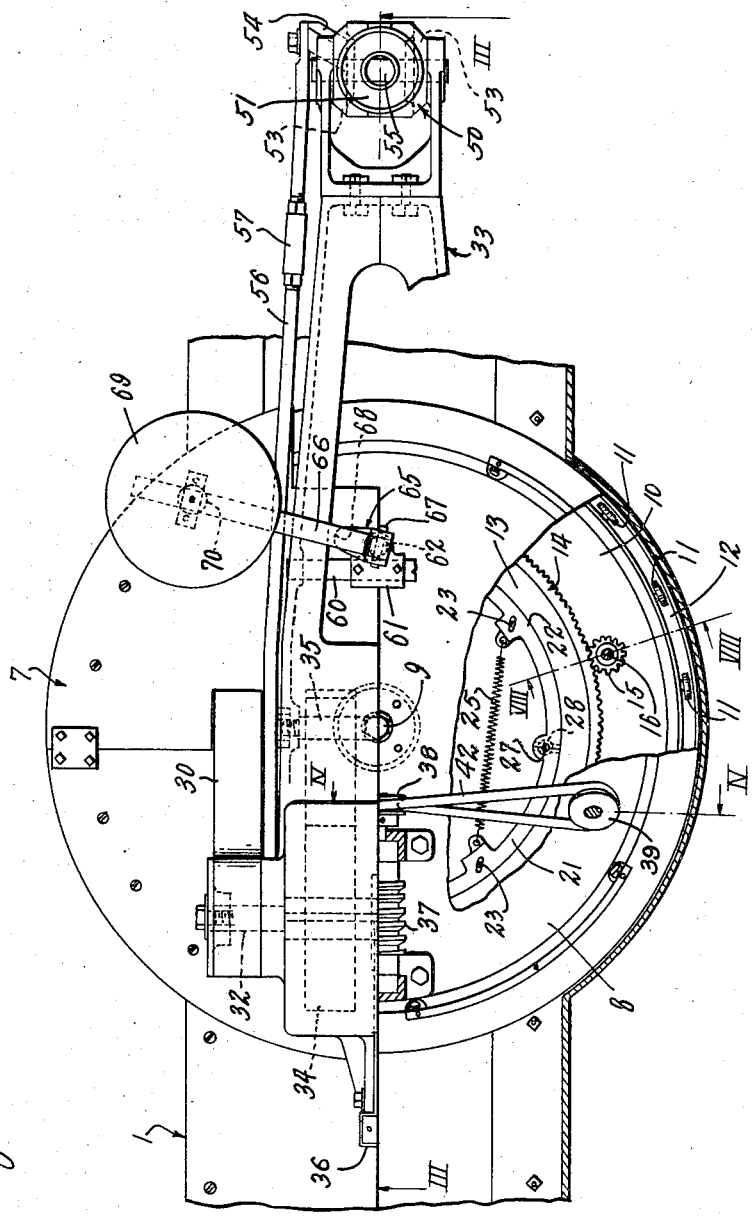
Fig. 2 is a plan view, partly broken away and partly in section, of the turntable means carried by the main bed frame of the device.

In the illustrative form of apparatus shown in the drawings the device includes a bed frame generically indicated at 1, such frame being provided with suitable wheels to permit ready movement of the entire apparatus. For example, wheels 2 may be carried by the rear end of the bed frame 1. The forward end of the bed frame may be provided with a raised portion 3 which is provided with castors 4. The handle member 5 may be attached to a vertical pin 6, the lower end of such pin being suitably connected to the front castors 4 so as to permit the castors to follow the handle and guidingly direct the movement of the device.

The bed frame 1 carries a turntable generally indicated at 7. The turntable itself is shown in greater detail in Figs. 2 and 3. As there shown, the turntable includes the member 8 which is rotatably mounted upon a stud 9 passing through the fixed or stationary bottom member 10 carried by the bed frame 1. The outer edges of the turntable 8 are provided with a plurality of peripherally spaced rollers 11 which ride along a circular track 12. A strip of felt may be carried by the upper edge of the track at or near the outer edge of the turntable 8 so as to make a dust-tight fit between such turntable and the stationary runway or channel 12.

A circular member 13 is firmly attached to the stationary plate member 10. A spur gear 14 is carried by the stationary member 10 and may be attached to the member 13. A pinion 15 mounted upon the end of a shaft 16 is in engagement with the spur gear 14. The shaft 16 is held in a suitable support or bearing 17 carried by the turntable 8 and such shaft 16 may be tubular and provided with a telescoping extension 13 provided with a keyway adapted to slidably receive a key 19 held in the tubular portion 16. The upper end of the shaft 18 may be provided with a hand wheel 20. It will be apparent that rotation of the hand wheel 20 will cause rotation of the pinion 15 which, by reason of its engagement with the spur gear 14, will cause the turntable 8 to be rotated.

Within the circular member 13 a pair of semi-circular brake shoes, indicated at 21 and 22, may be positioned by means of pins or screws 23 extending through tangentially directed slots formed in the brake members. The two brake members 21 and 22 incompletely form a circle and are normally held together and out of contact with the interior surface of the member 13 by means of springs 24 and 25. When it is desired to lock the turntable in position, however, a braking knob 26 is rotated, said braking knob being threaded upon the end of a bolt 27 provided with a conical head 28, such conical head fitting within a countersunk conical depression formed in adjacent or opposing ends of the brake members 21 and 22. The outer end of the bolt 27 is provided with a stop 29 so that rotation of the brake knob 26 causes the bolt 27 to move upwardly into the conical depression, forcing the two brake members 21 and 22 apart into frictional contact with the interior surface of the member 13, thereby effectively preventing further rotation of the turntable with respect to the member 13 or the stationary portion 10 of the bed frame.

Mounted upon the turntable 8 are pillars 30 and 31. These pillars carry a pivot pin 32 on which a boom, generally indicated at 33, is pivotally mounted. The boom is preferably hollow and a coiled spiral spring or springs 34 are positioned within the hollow boom and around the pivot pin 32, one end of the spring 34 being firmly attached to the pivot pin 32 whereas the other end bears against a suitable stop or portion of the boom as, for example, the bolt 35, thus tending to raise the free end of the boom. The weight or strength of the springs 34 should be such as to counterbalance the boom as much as possible.

The boom 33 is also provided with a segment of a spiral gear as shown at 36, this segment or sector being carried upon a suitable webbing firmly attached to the pivot end of the boom. Mounted upon the turntable 8 is a worm 37, suitable thrust bearings being employed, said worm 37 being in engagement with the spiral sector 36. Although various means for driving the worm 37 may be employed, those shown in the drawings comprise a V pulley 38 mounted upon the worm shaft and another pulley 39 mounted upon the end of a tubular shaft 40 journaled in a bearing 41. A belt 42 connects the two pulleys 38 and 39. The bearing 41 may be provided with a web 43 extending between angles 44 and 45 attached to the side of pillar 31. The web 43 may be provided with elongated slots through which pass tightening screws 46. By these means the shaft 40 may be positioned closer or farther away from the pulley 38, thereby facilitating tightening of the belt 42. The hollow shaft 40 may be provided with a telescoping shaft extension 47 on which the handle 48 is mounted. Suitable tightening means 49 permit the shaft 47 to be adjustably positioned within the tubular shaft 40. Rotation of the shaft 40 by means of the handle 48 will obviously drive the worm 37, causing the boom 33 to raise or lower. Very little effort is required to raise and lower the boom in view of the compensating effect of the springs 34.

Preferably the boom 33 is provided with a camera support which is pivotally connected to the boom at its outer end. Such camera support is indicated at 50 and may include a leveling head 51 and leveling screws 52. The camera support 50 may have downwardly extending ears 53 and an integral yoke member 54. The entire assembly is pivoted on a pin 55 journaled in the boom. In order to maintain the camera support 50 in a virtually horizontal plane irrespective of the position of the boom 33, the yoke 54 is pivotally connected by means of a link 56 with one of the pillars, such as the pillar 30. The link 36 may be adjustable in length as by means of the coupling 57 so that a desired inclination can be given to the camera support by lengthening or shortening the link 56.

The boom 33 is also provided with a seat which similarly pivots about a substantially horizontal pin 60. The pin 60 may be provided with a casting 61 having a vertical passageway therethrough, a tubular member 62 being slidably received in such passageway. The tube 62 may be provided with a plurality of diametrically extending apertures 63 adapted to receive a pin 64 which rests upon the top of the member 61. The upper end of the member 62 is provided with a casting 65 to which there is hinged a seat holder 66, the hinge being indicated at 67. The casting 65 is provided with an extension 68 extending in a direction opposed to that of the hinge 67 whereupon the member 66 may rest upon the extension 68.

The seat itself, indicated at 69, may be adjustably positioned along the member 66 by means of a strap and set screw 70. The pin 60 and the casting 61 are firmly attached to one another, the end of the pin 60 being provided with a lever arm 71 which is then connected by means of a link 72 with the pillar 31. As the boom is raised or lowered, the seat 69 will be maintained in a substantially horizontal plane. The seat holder 66 may be pivoted (together with the tubular member 62) within the casting 61.

When a protracted number of pictures are to be made from one position, it may be desirable to prevent the entire carriage from moving. The entire carriage, including the bed frame 1, may be leveled off and rendered immovable by means of four jack screws, indicated at 80, 81, 82 and 83, which may be lowered so as to take up the weight of the entire carriage, relieving the weight from the wheels and casters.

It will be seen, therefore, that provision has been made for a movable camera carriage capable of supporting the heavy soundproofed motion picture cameras now generally employed in motion picture photography. The boom may be swung in a complete circle if desired and may be raised or lowered at will. The heavy weight carried by the end of the boom is compensated for by means of springs so that very little effort need be exerted to move the boom.

Means are also provided whereby the camera support carried by the end of the boom may be adjustably positioned and automatically maintained at the same angle (or in a substantially horizontal plane) during any elevation or depression of the boom.

Attention is also called to the fact that the compensating springs are in the form of flat spirals and are enclosed within the boom or an enlargement thereof so that in the event of failure of a spring, the possibility of injury to persons in the immediate vicinity or to the camera operator, is minimized.

It is to be understood that although a specific embodiment of this invention has been described in detail, the invention is not limited to the particular structure shown in the drawings. Obviously, numerous changes and modifications could be made in the arrangement and construction of the device. The means for raising or lowering the boom may be materially varied. The arrangement, construction or attachment of the springs may be also varied. All changes and modifications coming within the scope of the appended claims are embraced thereby.

I claim:

1. In a camera carriage, the combination of: a movable bed frame, a turntable carried by the bed frame, a boom pivotally carried on said turntable, means carried by the turntable for selectively raising and lowering said boom, spring means movable with said turntable and operably connected to said boom tending to raise the outer end thereof, a camera support pivotally carried by the outer end of the boom, and means connecting said camera support and turntable adapted to maintain said camera support substantially horizontal during movement of the boom.

2. In a camera carriage, the combination of: a movable bed frame, a turntable carried by the bed frame, means for regulatably turning said turntable including a spur gear attached to the bed frame, a pinion mounted on the turntable and in engagement with said spur gear and means for rotating said pinion, a boom pivotally carried on said turntable, means for selectively raising and lowering said boom, and spring means operably connected to said boom tending to raise the outer end thereof.

3. In a camera carriage, the combination of: a movable bed frame, a turntable carried by the bed frame, means for regulatably turning said turntable, pillars provided with a pivot pin carried by said turntable, a boom pivotally mounted on said pin, a spiral gear sector carried by said boom, a worm gear rotatably mounted on said turntable and in engagement with said sector gear, means for driving said worm carried by the turntable, spiral spring means attached to the fixed pivot pin and to said boom tending to raise the outer end thereof, a housing for said spring means carried by said boom, a pivoted camera support carried by the outer end of the boom, a seat carried by said boom, a separate link means attached to said camera support and seat and to said pillars, said separate link means being adapted to maintain said camera support and seat substantially horizontal during movement of the boom.

4. In a camera carriage, the combination of: a movable bed frame, a turntable carried by the bed frame, means carried by the turntable for regulatably turning said turntable, supports on said turntable, a hollow boom pivotally mounted on said supports, spring means carried by said turntable tending to raise the outer end of the boom and enclosed by said hollow boom, a camera support pivotally carried by the outer end of the boom, and adjustable link means connecting said camera support and supports carried by said turntable and adapted to maintain said camera support substantially horizontal during movement of the boom.

VICTOR R. RABY.